United States Patent
Lowery

(10) Patent No.: US 7,837,130 B1
(45) Date of Patent: Nov. 23, 2010

(54) OVERSPRAY ERADICATOR

(76) Inventor: Robert S. Lowery, 8247 Forest Lake Dr., Conway, SC (US) 29526

( * ) Notice: Subject to any disclaimer, the term of this patent is extended or adjusted under 35 U.S.C. 154(b) by 0 days.

(21) Appl. No.: 12/169,256

(22) Filed: Jul. 8, 2008

Related U.S. Application Data

(63) Continuation-in-part of application No. 11/972,250, filed on Jan. 10, 2008, now abandoned.

(60) Provisional application No. 60/885,054, filed on Jan. 16, 2007.

(51) Int. Cl.
| | | |
|---|---|---|
| *B05B 1/28* | (2006.01) | |
| *A62C 13/62* | (2006.01) | |
| *A62C 13/66* | (2006.01) | |
| *A62C 35/58* | (2006.01) | |
| *B05B 9/03* | (2006.01) | |

(52) U.S. Cl. .................. 239/120; 239/104; 239/119; 239/302; 239/124; 118/232; 118/326

(58) Field of Classification Search .............. 239/120, 239/302, 105, 108, 121, 124, 126; 118/232, 118/326
See application file for complete search history.

(56) References Cited

U.S. PATENT DOCUMENTS

| | | | |
|---|---|---|---|
| 4,583,319 A | | 4/1986 | Wolff et al. |
| 4,611,760 A | | 9/1986 | Koresh |
| 5,305,494 A | | 4/1994 | Candler |
| 5,360,165 A | * | 11/1994 | Singhal ................... 239/122 |
| 5,393,345 A | * | 2/1995 | Smith ...................... 118/312 |
| 5,398,632 A | * | 3/1995 | Goldbach et al. ........... 114/222 |
| 5,489,234 A | * | 2/1996 | Hockett .................... 451/87 |
| 5,640,739 A | | 6/1997 | Campbell |
| 5,989,638 A | | 11/1999 | Nielsen |
| 6,143,048 A | | 11/2000 | Comproni et al. |
| 6,171,656 B1 | * | 1/2001 | Settles ..................... 427/294 |
| 6,264,711 B1 | | 7/2001 | Smith |
| 6,264,743 B1 | | 7/2001 | Cucuzza |
| 6,938,838 B2 | | 9/2005 | Kawamoto |

(Continued)

FOREIGN PATENT DOCUMENTS

DE 19738962 3/1999

OTHER PUBLICATIONS www.enviro-navair.navy.mil/currents/winter2003/Win03_APACTS_Painting.pdf accessed May 5, 2008.

*Primary Examiner*—Len Tran
*Assistant Examiner*—James S Hogan
(74) *Attorney, Agent, or Firm*—Paul H. Demchick

(57) ABSTRACT

Overspray eradicator. A portable spray and overspray capture system including a portable vacuum filtration and spray gun air power supply unit including an air pressurization system, a vacuum creation system, a high efficiency particulate air filter, and an organic vapor filter, the portable vacuum filtration and spray gun air power supply unit in pressurized air communication with, and vacuum communication with, a visibility sparing spray shroud, the shroud including a spray gun or a spray gun fitting, a vacuum fitting and a plurality of extensions each with an aperture allowing fluid communication between the interior of the shroud and the exterior of the shroud the shroud having internal fluid passages to allow fluid communication between each of the extensions and the vacuum fitting.

15 Claims, 14 Drawing Sheets

U.S. PATENT DOCUMENTS 7,208,031 B1  4/2007  Hendrickson
7,334,742 B2  2/2008  Jahnke et al.
2005/0196543 A1 *  9/2005  Morton .................... 427/421.1
2007/0295210 A1  12/2007  Smith

* cited by examiner

OVERSPRAY ERADICATOR

CROSS-REFERENCE TO RELATED APPLICATIONS

This application is a continuation-in-part and claims benefit under 35 USC §120 of U.S. Non-Provisional application Ser. No. 11/972,250, filed on 10 Jan. 2008 now abandoned, entitled "PAINT OVERSPRAY ERADICATOR," which is hereby incorporated by reference in its entirety, which claimed priority benefit of U.S. Provisional Application Ser. No. 60/885,054 filed on 16 Jan. 2007, entitled "PAINT OVERSPRAY ERADICATOR," which is incorporated by reference herein in its entirety.

STATEMENT REGARDING FEDERALLY SPONSORED RESEARCH OR DEVELOPMENT REFERENCE TO SEQUENCE LISTING, A TABLE, OR A COMPUTER PROGRAM LISTING COMPACT DISK APPENDIX

Not applicable

BACKGROUND OF THE INVENTION

Technologies and methods exist for spray painting a variety of coating materials on a wide range of commercial and non-commercial products. These methods include airless, high-pressure air, powder coating, electrostatic, and high-volume, low-pressure (HVLP) spraying.

Transfer efficiency is defined as the percentage of sprayed product that adheres to the intended target. High-pressure air application techniques typically have a transfer efficiency (TE) of 35%. The amount of sprayed product that does not adhere to the target (100%-TE) is known as "overspray." By way of illustration, a high-pressure air application technique with a TE of 35% would have 65% overspray. The overspray consists of small droplets that can travel significant distances before being deposited onto the ground, water, or other surfaces.

HVLP spray painting technology provides increased transfer efficiency, typically 60 to 70% TE, with only 30 to 40% overspray.

Most paint and other coating materials, including waterborne paint, contain varying amounts of volatile organic compounds (VOCs). Volatile organic compounds are regulated as hazardous to the environment and are considered by many in the scientific community to be significant contributors to global warming and ozone depletion. Furthermore, volatile organic compounds released from paint overspray contribute to the formation of smog. Sunlight reacts with volatile organic compounds to create ground level smog. Smog is believed to contribute to lung disease.

Human exposure to volatile organic compounds can cause headaches, eye irritation, nausea, dizziness, and fatigue. Paint technicians exposed to volatile organic compounds for an extended period of time can suffer permanent damage to the central nervous system, liver, and kidneys.

Every year in the United States alone, millions of pounds of spray painted coatings containing volatile organic compounds are applied. Traditionally, spray painting operations involving motor vehicles take place inside approved spray booth structures, which are regulated, in the United States, by the Environmental Protection Agency (EPA), the National Fire Protection Association (NFPA), and the Occupational Safety and Health Administration (OSHA).

Approved spray booth structures contain filter elements that capture overspray, which, if not captured by abatement means, becomes fugitive (airborne) and hazardous to the environment. However, there are many small re-finish type repairs performed to motor vehicles not within the confines of an approved spray booth. Additionally, there are numerous non-automotive spray painting operations performed outdoors or in non-approved indoor areas.

Non-limiting examples of non-automotive spray painting operations in which products containing volatile organic compounds are sprayed outside of an approved spray booth include structural steel and interior painting on large commercial buildings, water towers, signal towers, bridges, commercial and non-commercial boats and ships, railroad equipment, on-site commercial office furniture finishing and re-finishing, commercial and residential bathroom fixture re-finishing, commercial and non-commercial aircraft finishing and re-finishing, residential housing exterior and interior painting, commercial and noncommercial sign painting, agricultural equipment re-finishing, and motorcycle refinishing.

Many spray painting operations are performed outside of a spray booth because it is either impractical or impossible to place the object to be painted into a spray booth. Even when it would be practical to place an object in a spray booth, spray booths meeting the regulatory requirements are expensive to purchase and install.

There are many operations other than painting which involve spraying in which it is desirable to capture overspray. A few non-limiting examples include operations involving the spraying of hair spray, biocides, cleaners and sun-independent skin tanning agents.

BRIEF SUMMARY OF THE INVENTION

Certain embodiments of the present invention are equipment for capturing overspray. Certain embodiments of the present invention are methods for capturing overspray. Certain equipment embodiments of the invention include a shroud that attaches to a paint spray gun which can prevent overspray from escaping into the environment. Certain of those embodiments allow ready observation of the area being sprayed.

Certain embodiments of the invention are intended to capture overspray in non-paint operations.

It is an object of certain embodiments of the present invention to provide an apparatus and a method for containing overspray at its source.

BRIEF DESCRIPTION OF THE DRAWINGS

FIG. 16 is hatched to indicate the area in which gasses can freely move.

DETAILED DESCRIPTION OF EMBODIMENTS OF THE INVENTION

In this specification the words "vacuum" and "suction" are used interchangeably. Similarly, each form of the word "vacuum" and the analogous form of the word "suction" are used interchangeably. It should be noted that in this disclosure "vacuum" refers to air with pressure below ambient pressure, not the total absence of air.

Figure 1:
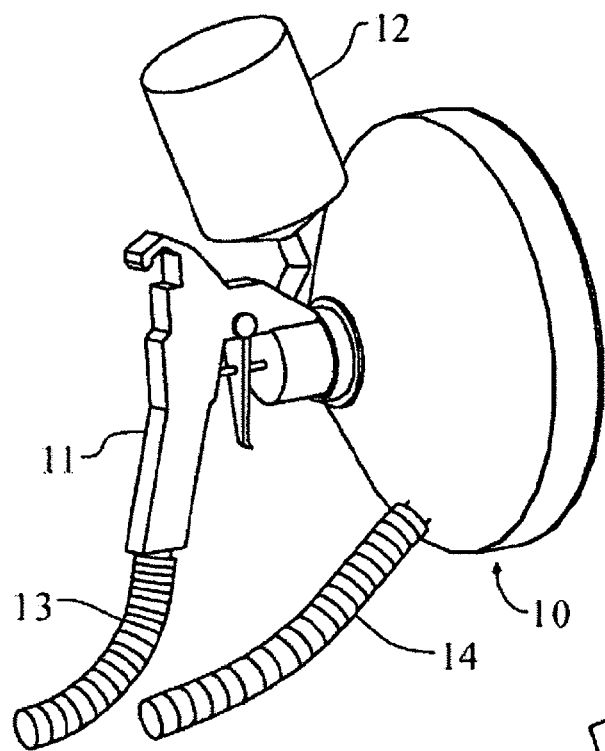
FIG. 1 is an isometric view of a paint overspray shroud according to the present invention mounted on a paint spray gun.
Figure 2:
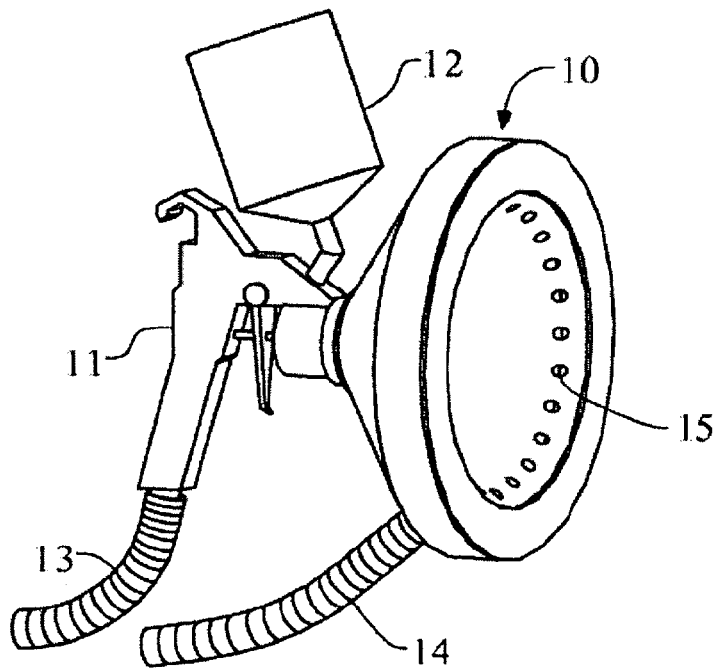
FIG. 2 is a different isometric view of the paint overspray shroud shown in FIG. 1.

FIGS. 1 and 2 are isometric views of a closed shroud 10 according to the present invention attached to a paint spray gun 11 with a paint reservoir 12. An air pressure supply hose 13 and a suction hose 14 are also depicted. A plurality of apertures (identifier 15 indicates one of the apertures) is provided for removal of paint overspray.

Figure 3:
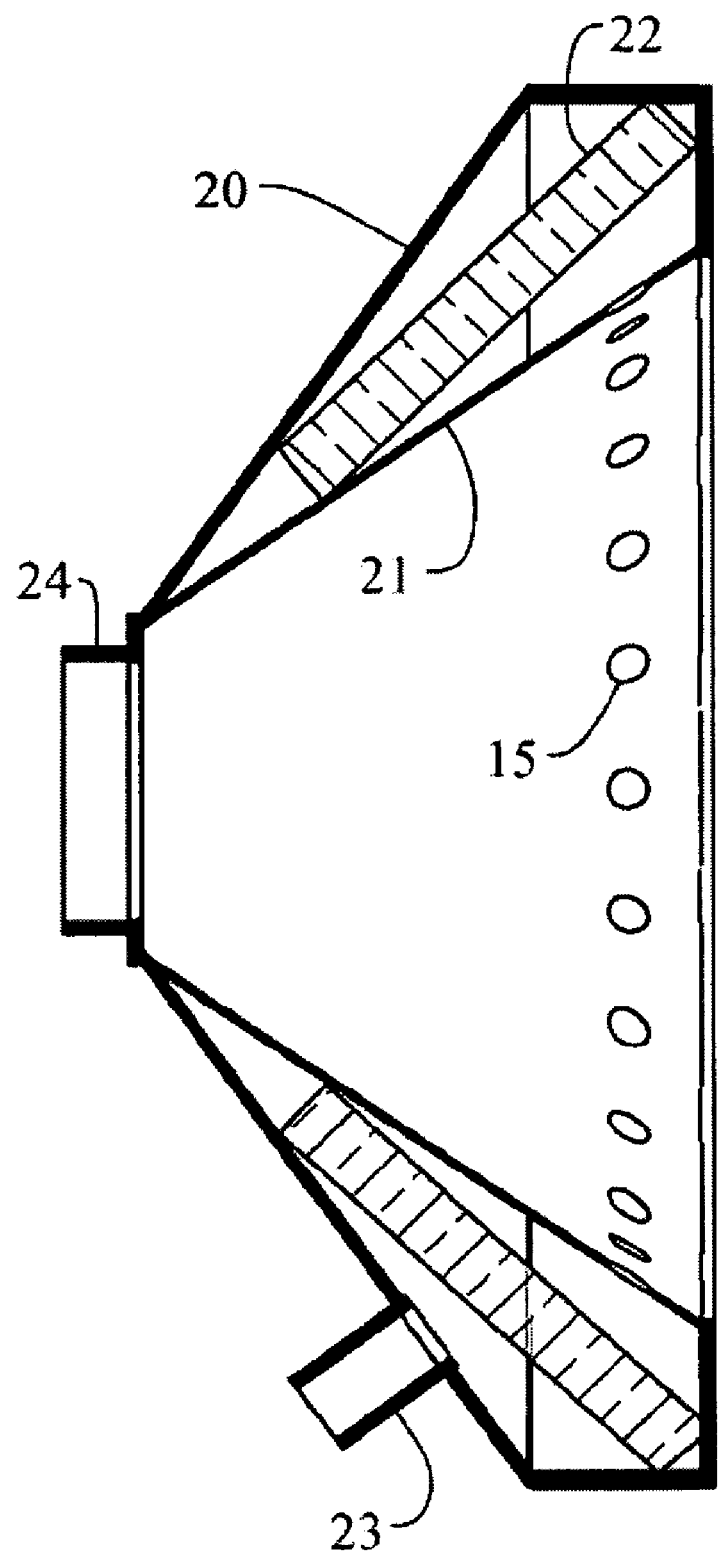
FIG. 3 is a cross-section of a paint overspray shroud according to the present invention.

FIG. 3 is a cross-sectional view of the same closed shroud embodiment that was depicted in FIG. 1 and FIG. 2, showing an enclosure having an outer enclosure portion 20 and an inner enclosure portion 21. A filter 22 is fixed within the plenum between the inner and outer enclosure portions. A fitting 23 provides a place to attach a source of vacuum. A flange 24 is used to attach a paint spray gun. When used in a spray painting application, a significant percentage of the paint overspray is suctioned into the apertures 15 in the inner enclosure portion 21. The overspray must then pass through, and be processed by, a filter 22 before proceeding to the vacuum source. In this embodiment the inner and outer enclosure portions are shown as conical sections, but other shapes are also suitable and are within the scope of the claimed invention.

Filter 22 can be a particulate filter, an organic vapor filter or a combination filter. Suitable particulate filters include high efficiency particulate air (HEPA) filters, depth filters and combinations of depth and HEPA filters. A preferred type of organic vapor filter is the carbon granule type, but a variety of commercially available types of organic vapor filters are also suitable. Alternatively, filters are housed in the device providing a source of vacuum rather than between the inner and outer conical sections of the shroud.

Figure 4:
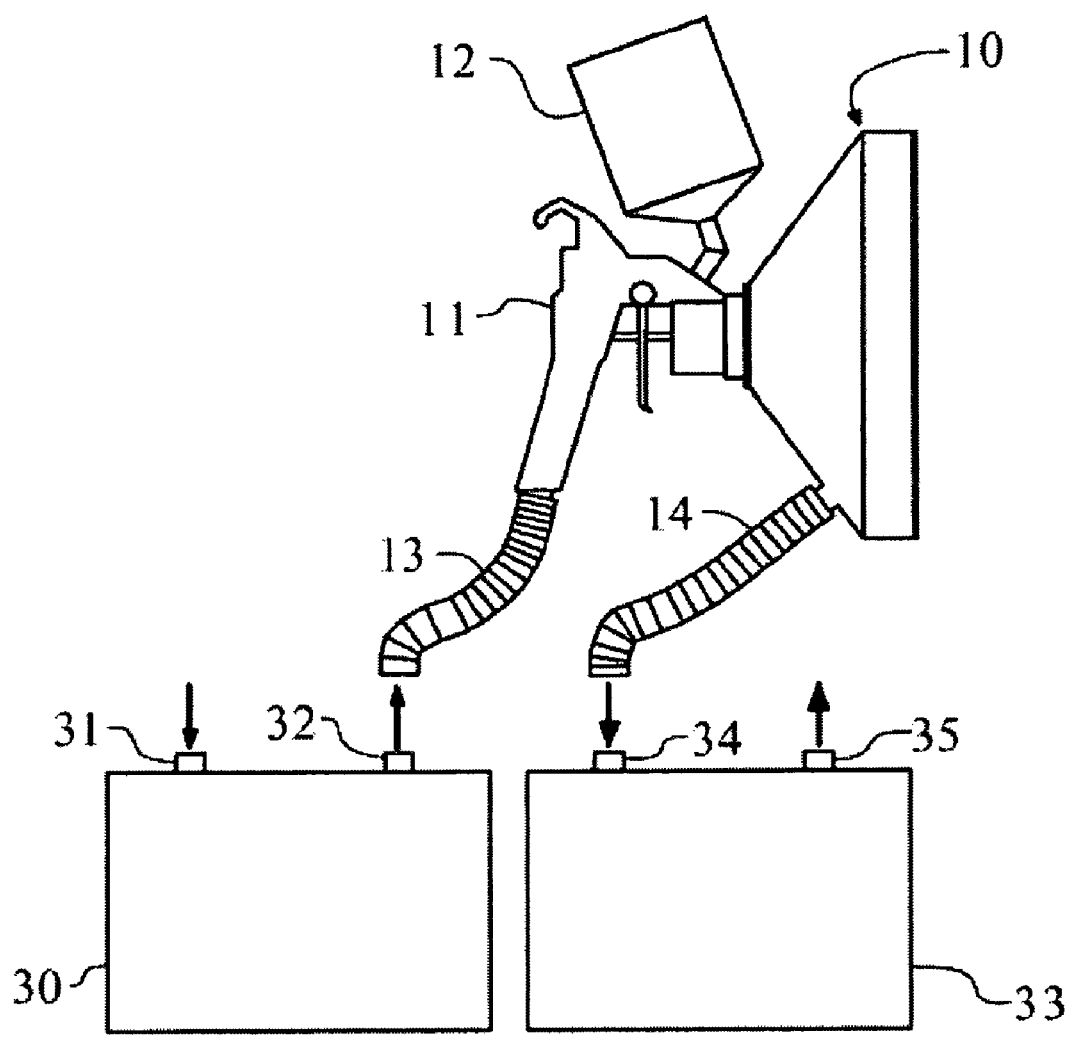
FIG. 4 depicts a paint overspray shroud according to the present invention mounted on a spray gun with an air pressure source and a suction source.

FIG. 4 depicts a closed shroud embodiment 10, a paint spray gun 11, a paint reservoir 12, an air pressure hose 13, a vacuum hose 14, an air pressure pump 30, having an inlet 31, and an outlet 32, and a vacuum pump 33 having an inlet 34 and an outlet 35. The air pressure pump 30 is a commercially available HVLP pump as is commonly used in high-volume, low-pressure spray paint applications. Vacuum pump 33 is similar to pump 30 but preferably has an explosion proof motor and optionally can accommodate particulate and/or organic vapor filters. In the illustration, the gaps between the ends of the hoses and the pumps are used to indicate that the hoses have been shortened for clarity in the illustration; in a practical application the hoses would be significantly longer in order to allow sufficient freedom of motion for spray painting.

Figure 5:
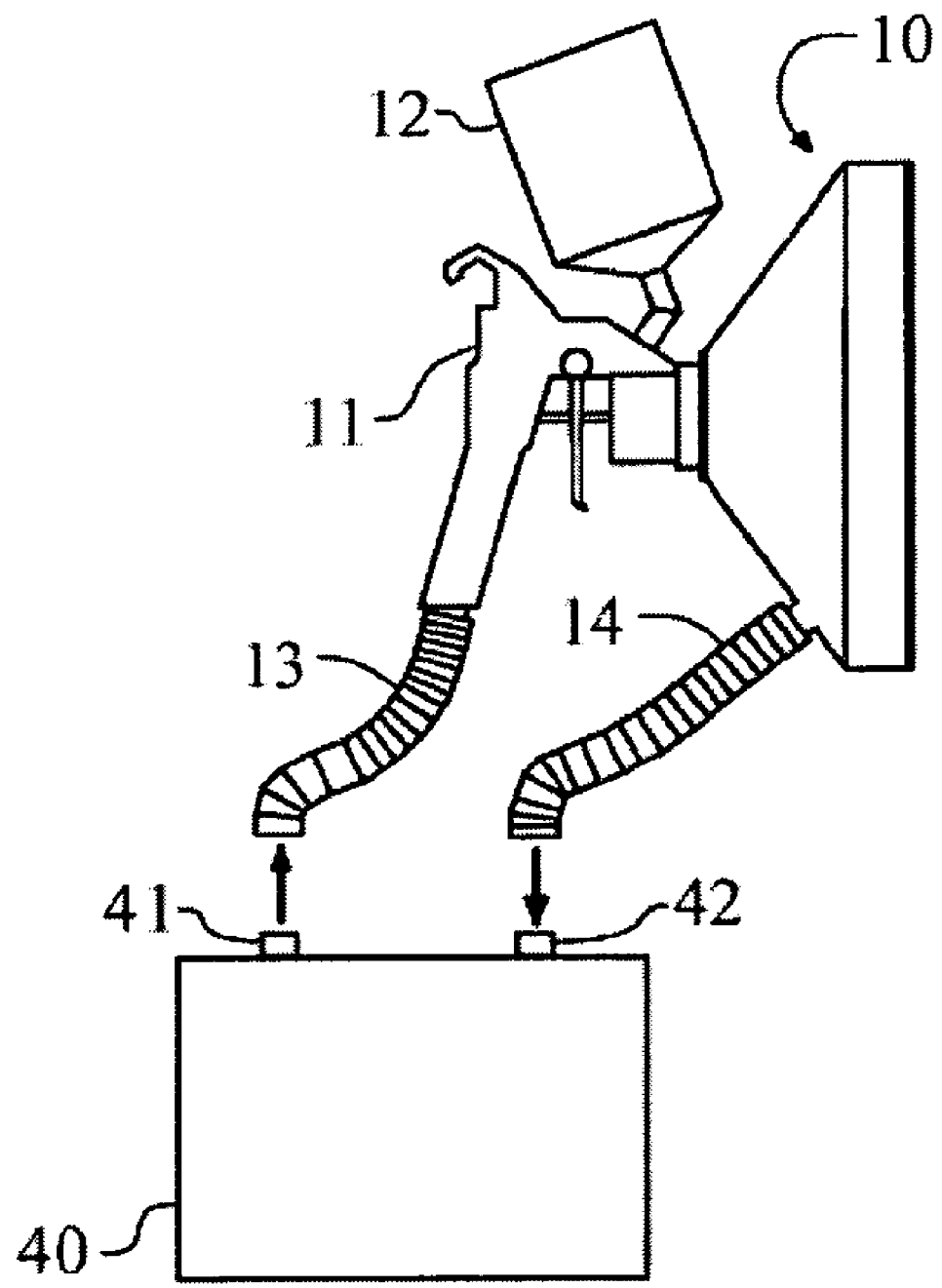
FIG. 5 depicts a paint overspray shroud according to the present invention mounted on a spray gun in a closed-loop system with a single air device providing both a source of air pressure and a source of suction.

In FIG. 5, the air supply pump and the suction pump depicted in FIG. 4 are replaced with a single pump 40 having an air pressure supply 41 and a vacuum supply 42. This embodiment is a closed system in which the overspray-laden air is first filtered and then recycled through the pump to be used again as the air pressure source for the spray gun.

Figure 6:
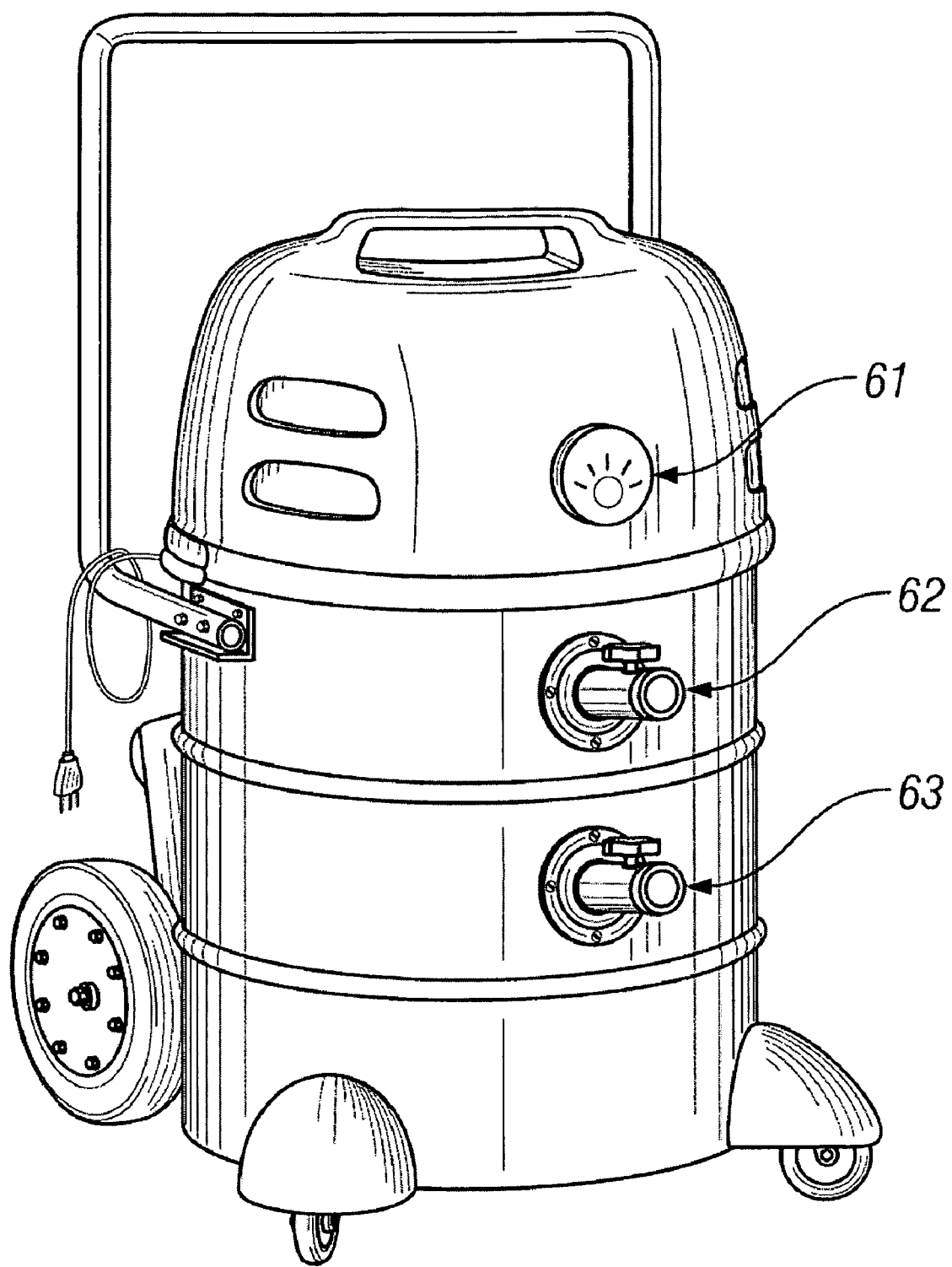
FIG. 6 is an isometric depiction of a Vacuum/Filtration and Spray Gun Air Power Supply Unit [VFAS] which is a component of some embodiments of the invention disclosed here in closed and assembled configuration.

Some embodiments of the invention disclosed here include a portable vacuum filtration and spray gun air power supply unit (VFAS). FIG. 6 is an isometric depiction of such a VFAS which is a component of some embodiments of the invention disclosed here in closed and assembled configuration. The VFAS is equipped with a differential pressure gauge 61 (e.g. a MAGNEHELIC differential pressure gauge). That gauge would indicate when in is appropriate to replace the filter. The VFAS is also equipped with a spray gun air supply connector port 62 with an air pressure regulator and a pressure by-pass fitting. The VFAS is also equipped with a vacuum port with vacuum pressure regulator fitting.

Figure 7:
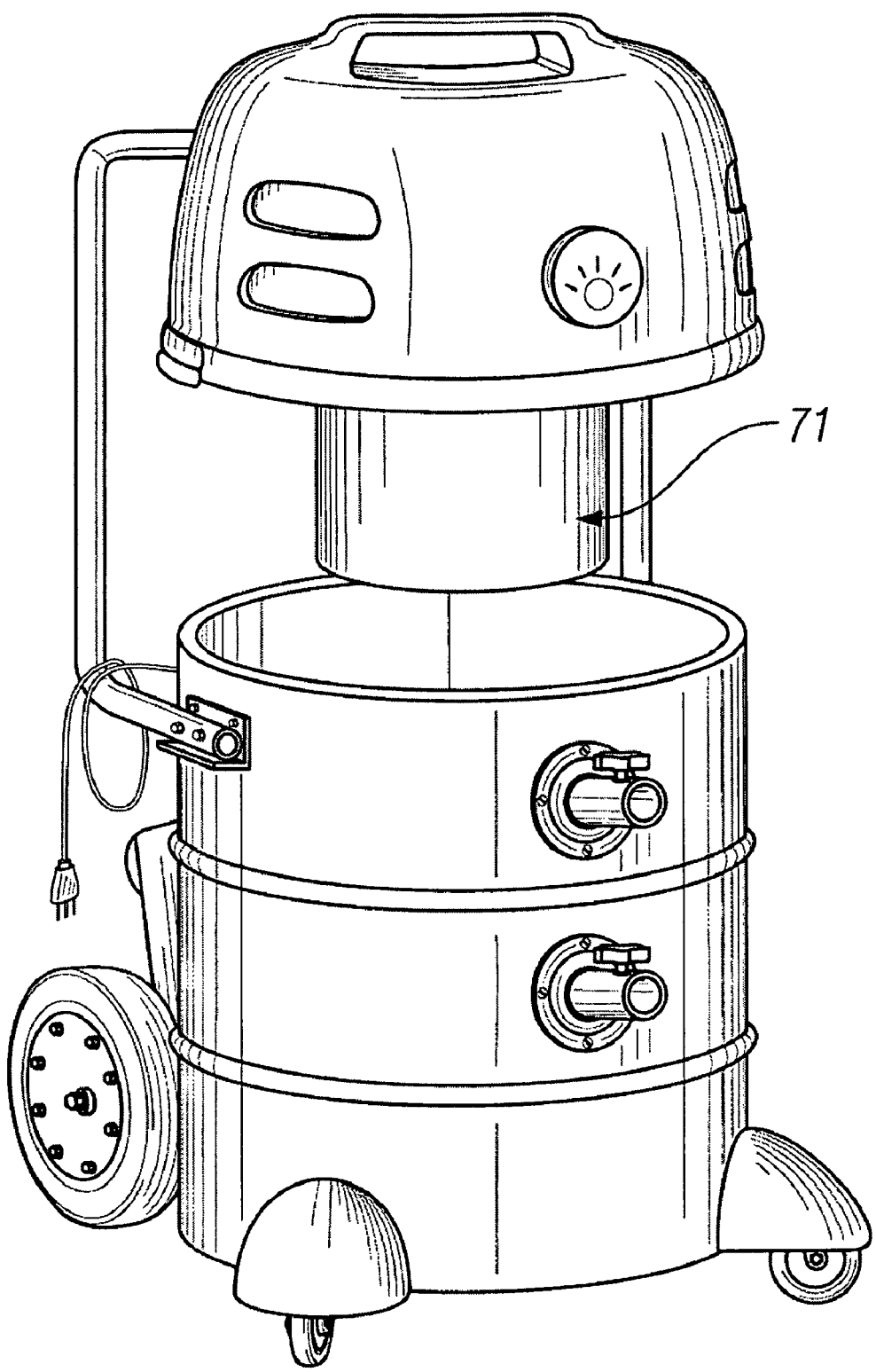
FIG. 7 is an isometric depiction of the same VFAS which is depicted in FIG. 6. However, in FIG. 7, the VFAS is depicted with the cap raised showing some features not visible when the VFAS is closed.

FIG. 7 is an isometric depiction of the same VFAS which is depicted in FIG. 6. However, in FIG. 7, the VFAS is depicted with the cap raised showing the HEPA and carbon impregnated filter elements 71 which were not visible when the VFAS is closed. The filter elements in the preferred embodiment provide removal of the vast majority of all hazardous substances and paint solvent vapors.

Figure 8:
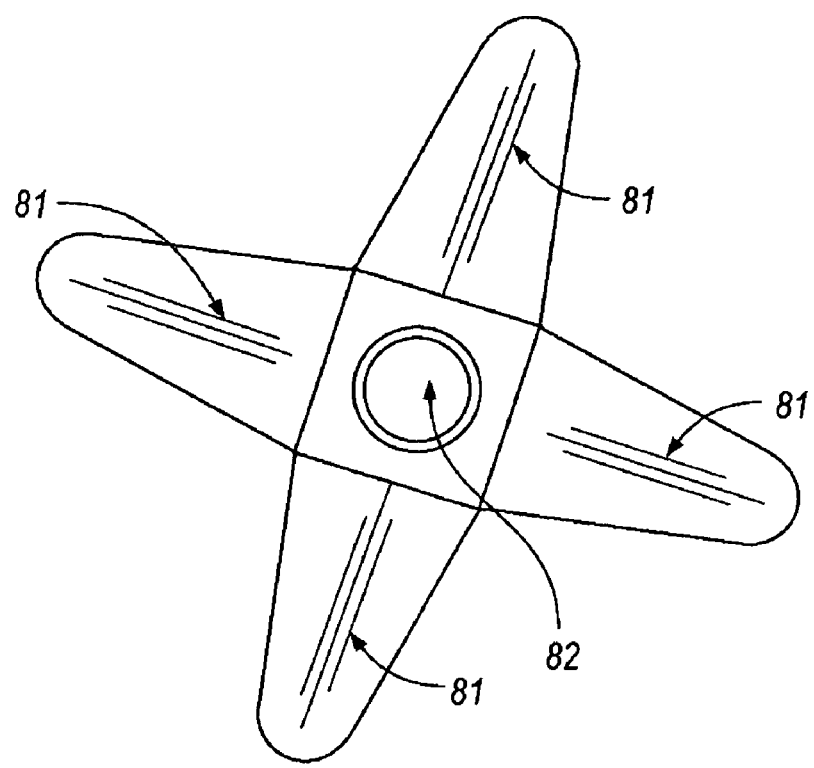
FIG. 8 is a view of component I of the preferred embodiment of the shroud. The depiction is facing the side that would be on the outside of the assembled component I.

The embodiments of the overspray collection shroud described above can effectively capture overspray. However, they also significantly block the visibility of the target being sprayed. Therefore, the preferred embodiment of the shroud was developed to effectively capture overspray while allowing observation of the area being sprayed. Since it is frequently greatly advantageous to be able to see the area being painted, this embodiment has significant advantages. Although other visibility preserving embodiments will be discussed below, the preferred embodiment is the best embodiment known in terms of effective overspray capture paired with largely unimpaired visibility. It is worth noting that there are closed shroud embodiments of the invention disclosed here in which the shroud is substantially transparent. However, those embodiments do little to help in viewing the area being sprayed because the transparent materials quickly become coated with paint, rendering the shroud substantially opaque. FIG. 8 is an isometric view of component I of the preferred embodiment of the shroud. The depiction is facing the side that would be on the outside of the assembled component I. Elongated slits 81 provide a means for paint overspray to be suctioned from the surface being spray painted. There is a center opening 82. This embodiment is approximately 18 cm across.

Figure 9:
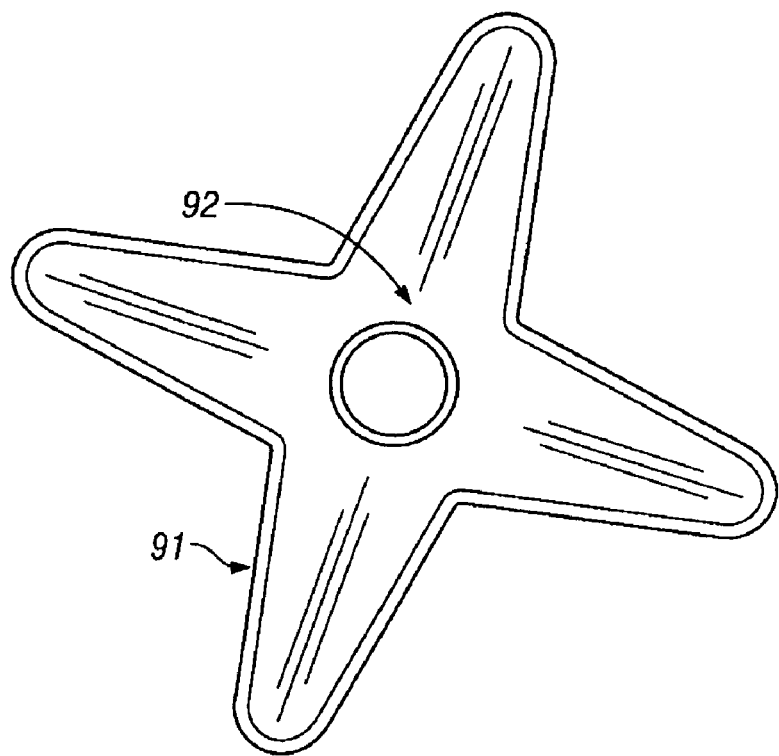
FIG. 9 is a view of component I of the preferred embodiment of the shroud. The depiction is facing the side that would be on the inside in the assembled component I.

FIG. 9 is an isometric view of component I of the preferred embodiment of the shroud. The depiction is facing the side that would be on the inside of the assembled component I. The concave interior 92 facilitates the housing of a paint overspray vapor particulate pre-filter and also allows even distribution of vacuum air flow to all four arms of the shroud which, therefore, provides for efficient overspray extraction. The outer edges 91 snap fit over component II of the shroud device. This feature allows for quick and easy cleaning and filter replacement.

Figure 16:
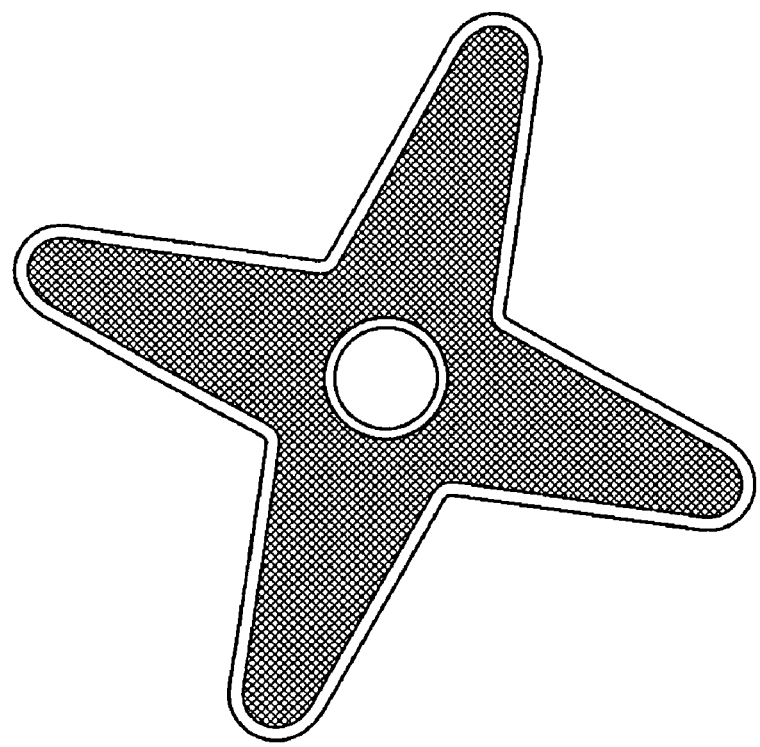
FIG. 16 is a view of component I of the preferred embodiment of the shroud from essentially the same view point as FIG. 9.

FIG. 16 is a view of component I of the preferred embodiment of the shroud from essentially the same view point as FIG. 9. FIG. 16 is hatched to indicate the area in which gasses can freely move.

Figure 17:
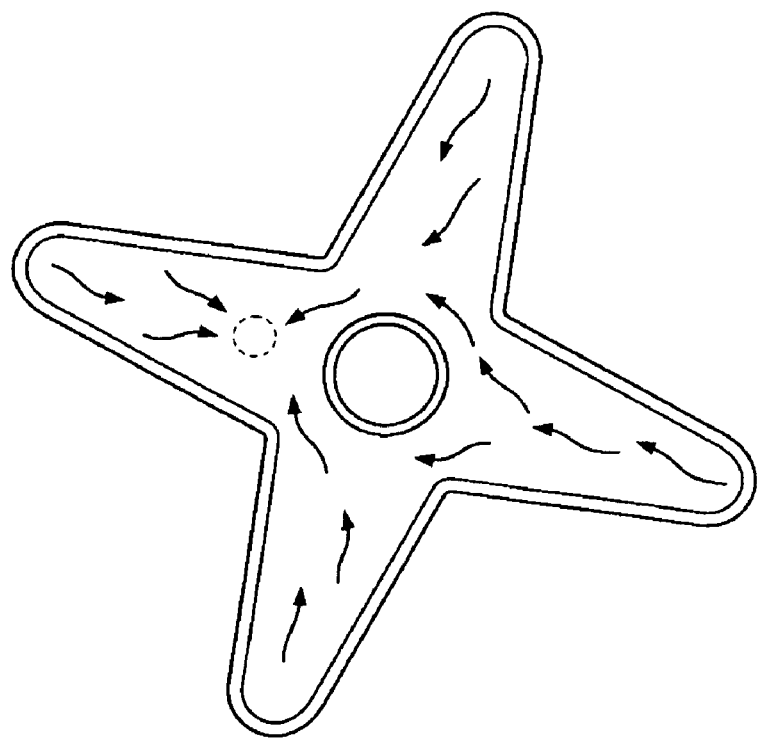
FIG. 17 is a view of component I of the preferred embodiment of the shroud from essentially the same view point as FIG. 9. Arrows give a general sense of the gas flow patterns within the shroud when it is in typical use. It should be noted that the arrows are not based on detailed experimental analysis of the flow patterns within this embodiment.

FIG. 17 is a view of component I of the preferred embodiment of the shroud from essentially the same view point as FIG. 9 and FIG. 16. Arrows give a general sense of the gas (e.g., air laden with hazardous over-spray) flow patterns within the shroud when it is in typical use. It should be noted that the arrows are not based on detailed experimental analysis of the flow patterns within this embodiment.

Figure 10:
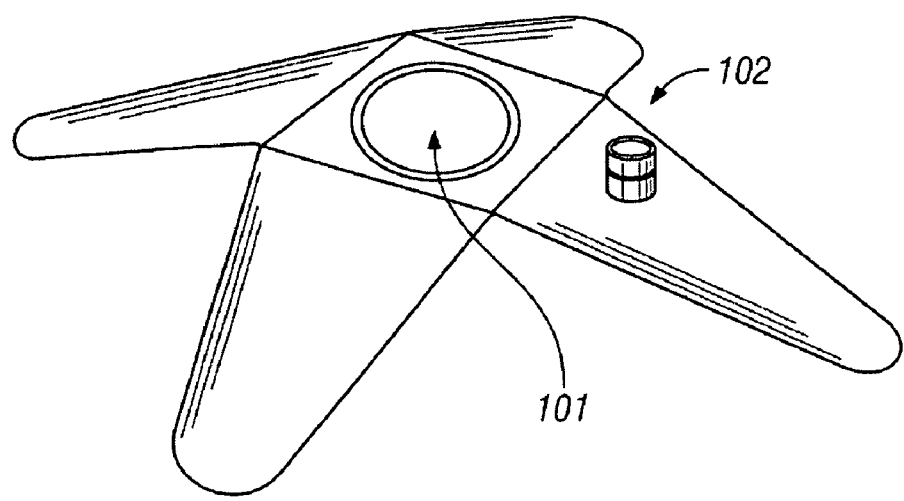
FIG. 10 is an isometric depiction of the preferred embodiment of the shroud, assembled.

FIG. 10 is an isometric depiction of the preferred embodiment of the shroud, assembled. It features a vacuum hose quick connect fitting 102 and a center opening that fits over the distal end of a paint spray gun 101.

Each of the four arms of the preferred embodiment of the invention disclosed here is canted approximately 15° from the general plane of the central region of the shroud (the area containing the center opening). Although embodiments of the invention disclosed here could have arms angled differently, angles from 5°-45° are preferred and angles from 7°-30° are even more preferred and angles from 10°-22° are even more preferred. Although other embodiments of the invention disclosed here could have different numbers of arms, four is the preferred number. Generally, when the number of arms is increased, the effectiveness in capturing overspray is increased. However, that is at the expense of decrease visibility. Generally, when the number of arms is decreased, the visibility is increased, but at the cost of decreased overspray capture effectiveness. Four arms have been found to give a balance between effective overspray capture and good visibility. Although other numbers are possible, embodiments of the invention with at least two and not more than eight arms are preferred, embodiments with at least three and not more than six arms are even more preferred, and embodiments with exactly four arms are most preferred. Embodiments of the invention disclosed here can have arms shaped differently, even radically differently, than those in the preferred embodiment. However, the specific shape of the arms in the preferred embodiment gives good spray capture effectiveness, allows good visibility, has good mechanical strength, facilitates opening and closing to allow changing of the paint overspray vapor particulate pre-filter and is practical to fabricate. There are embodiments of the invention disclosed here with dimensions which are different from those of the preferred embodiment. However, those dimensions are appropriate for portable automobile refinishing operations. There are open shroud embodiments of the invention enclosed here in which the arms of the shroud are not all essentially one geometry and size. However, in the preferred embodiment of the shroud, all arms have essentially the same geometry and size.

Although there are embodiments of the invention disclosed here composed of different materials, in the preferred embodiment of the overspray capture shroud, component I and component II are manufactured from a light weight, paint solvent proof composite plastic material.

In the preferred embodiment of the VFAS component of the invention disclosed here, all electrical components (including, but not limited to, motors, connectors, electrical fittings and switches) of the VFAS, are rated "Explosion Proof" for Class 1, Div 1, groups B, C, D. However, depending on the intended application, that might not be necessary. There are embodiments of the VFAS which have electrical components which are not explosion proof.

The preferred embodiment of the VFAS operates on 110 volts AC and has a NEMA Type 5-15P plug. The electrical supply powers a motor which facilitates the creation of pressurized air for use by a spray gun and vacuum used for overspray capture by a shroud. However, there are embodiments of the VFAS which operate on a different voltage or connect to electrical power in a different manner.

There are embodiments of the VFAS which are similar to the preferred embodiment, but operate pneumatically instead of electrically. For example, the motor which creates the vacuum in some embodiments is able to be powered by compressed air. Those embodiments have no electrical components that would otherwise need to be sealed and need to be explosion proof For the operation of those embodiments, the air motor is supplied compressed air from a remote air compressor.

VFAS units are suitable for use with the preferred embodiment of the shroud component of the invention disclosed here. VFAS units could also serve other functions including use with other overspray capture equipment (including but not limited to shrouds). The preferred embodiment of the VFAS includes wheels.

Figure 11:
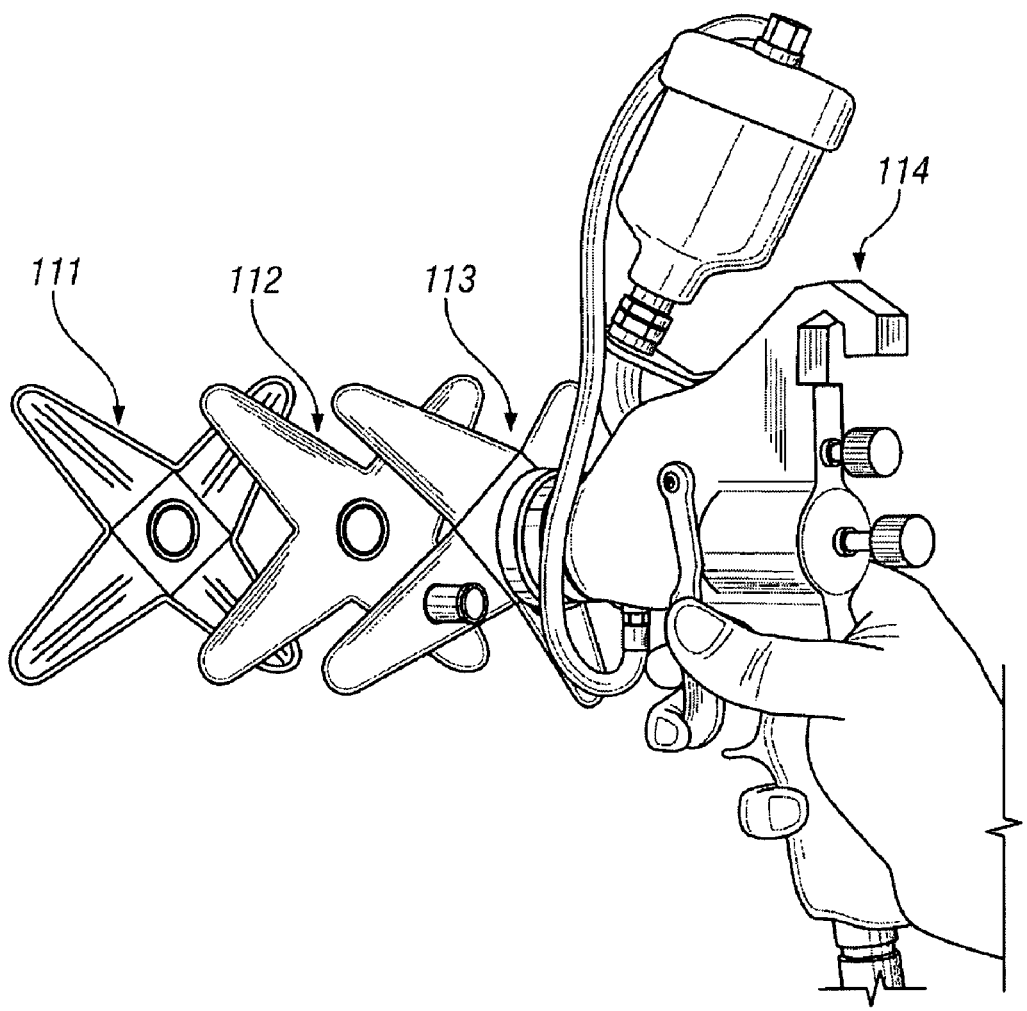
FIG. 11 depicts a HVLP paint spray gun with component II of the preferred embodiment of the shroud attached and other components of the preferred embodiment of the shroud in exploded view.

FIG. 11 depicts a HVLP paint spray gun 114 with component II 113 of the preferred embodiment of the shroud attached and, in exploded, a paint overspray vapor particulate pre-filter 112, component I 111 of the preferred embodiment of the shroud. The paint overspray vapor particulate pre-filter traps the vast majority of all particulate solids and liquid droplets, preventing them from migrating into the vacuum hose.

Figure 12:
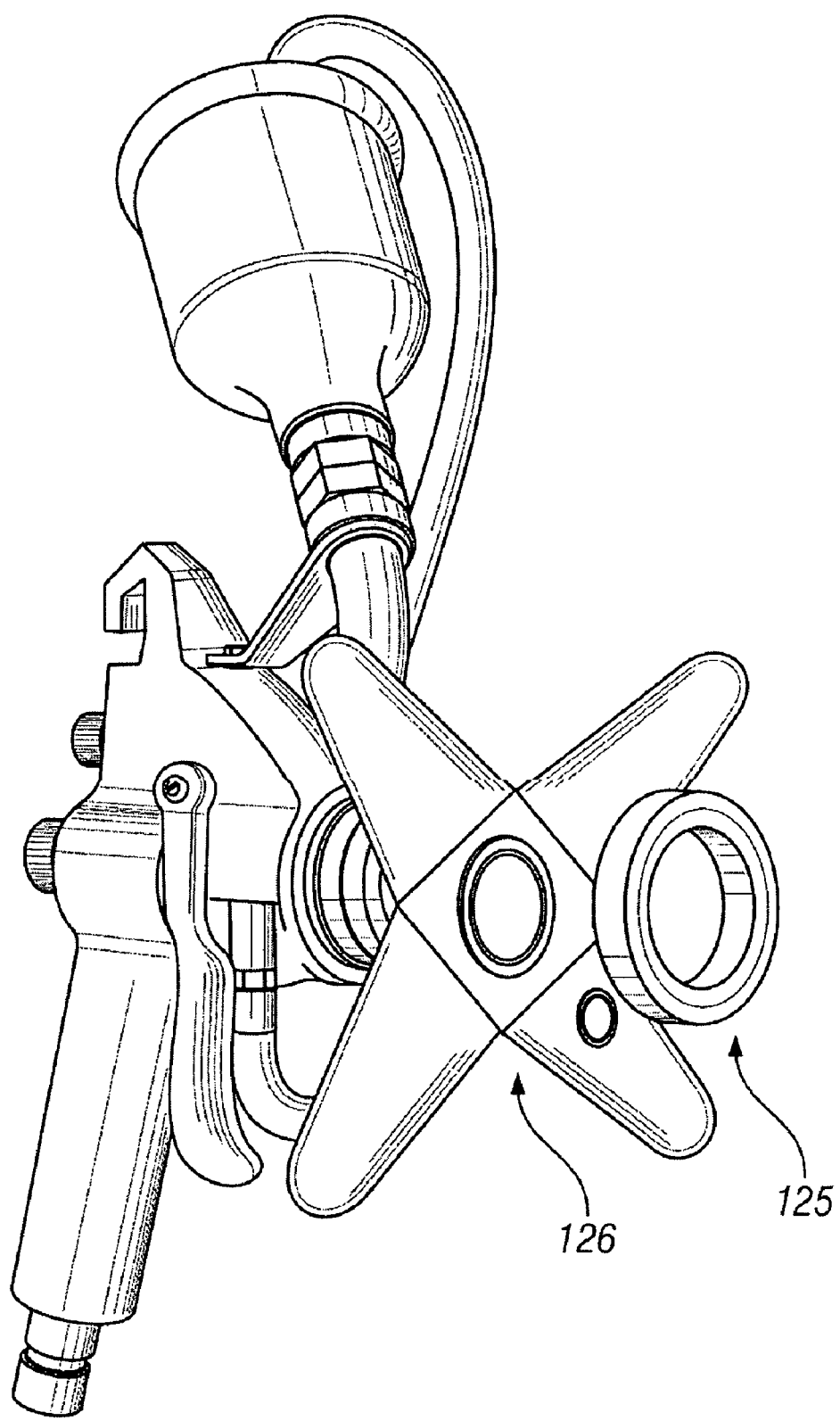
FIG. 12 depicts a HVLP paint spray gun with component I of the preferred embodiment of the overspray collection shroud and, in exploded view, a retaining ring which would attach component Ito the spray gun.

FIG. 12 depicts a HVLP paint spray gun with component I 126 of the preferred embodiment of the overspray collection shroud and, in exploded view, a retaining ring 125 which would attach component Ito the spray gun.

Figure 13:
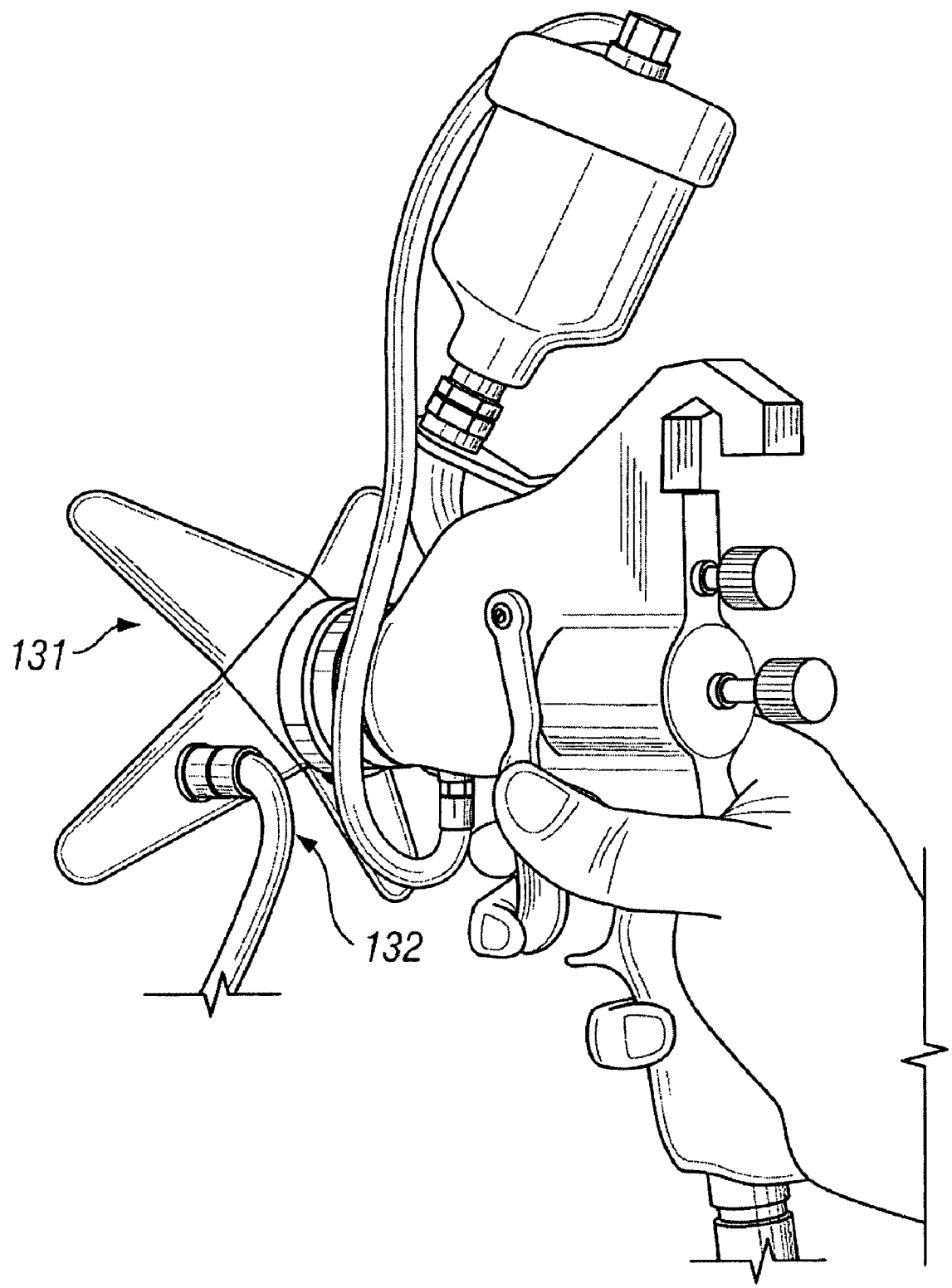
FIG. 13 is an isometric depiction of a HVLP paint spray gun with the preferred embodiment of the overspray collection shroud attached.

FIG. 13 is an isometric depiction of a HVLP paint spray gun with the preferred embodiment of the overspray collection shroud 131 attached. A vacuum hose 132 is attached via the vacuum hose quick connect fitting.

Figure 14:
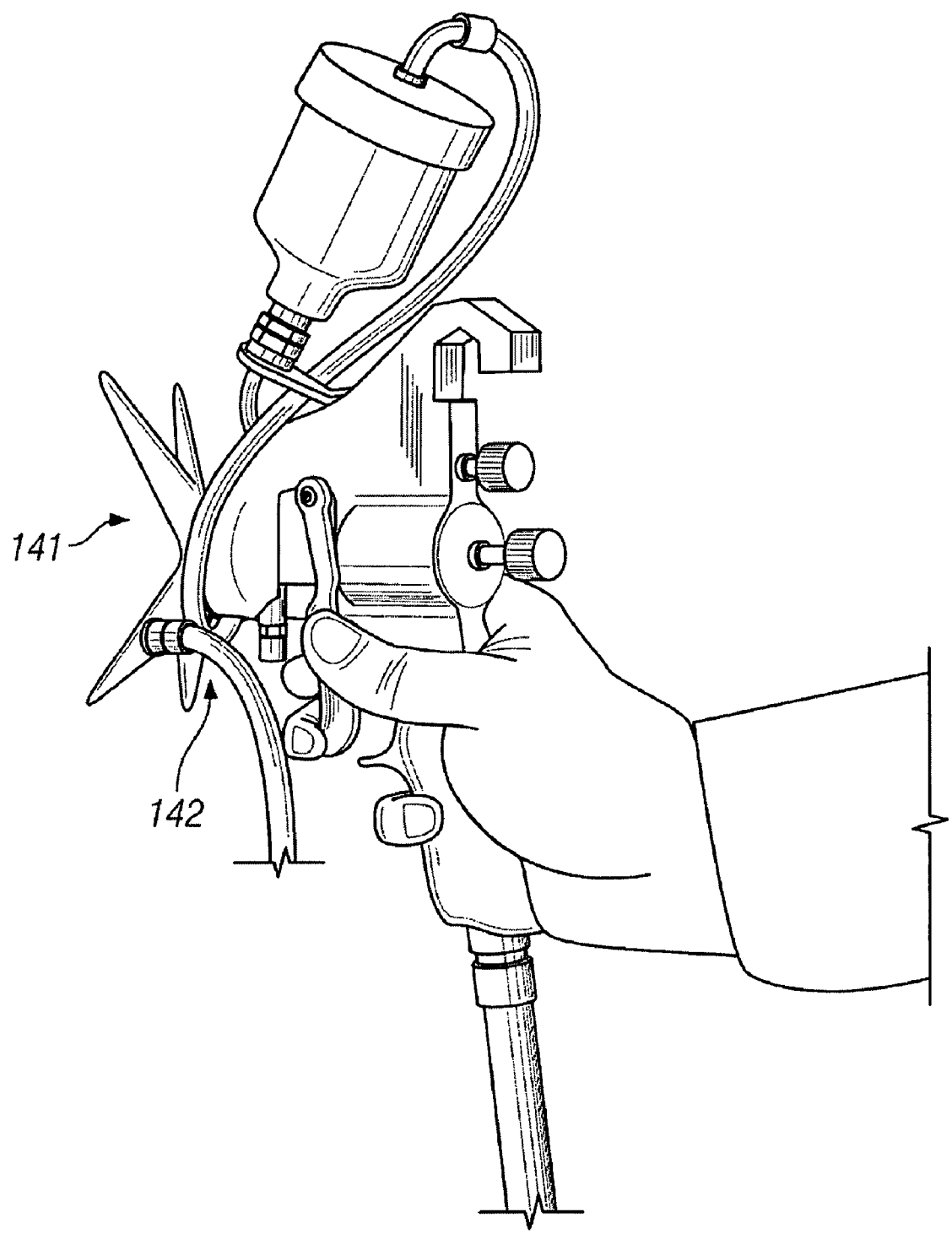
FIG. 14 is an isometric depiction of a HVLP paint spray gun with the preferred embodiment of the overspray collection shroud attached to a vacuum hose.

FIG. 14 is an isometric depiction of a HVLP paint spray gun with the preferred embodiment of the overspray collection shroud 141 attached to a vacuum hose 142.

Figure 15:
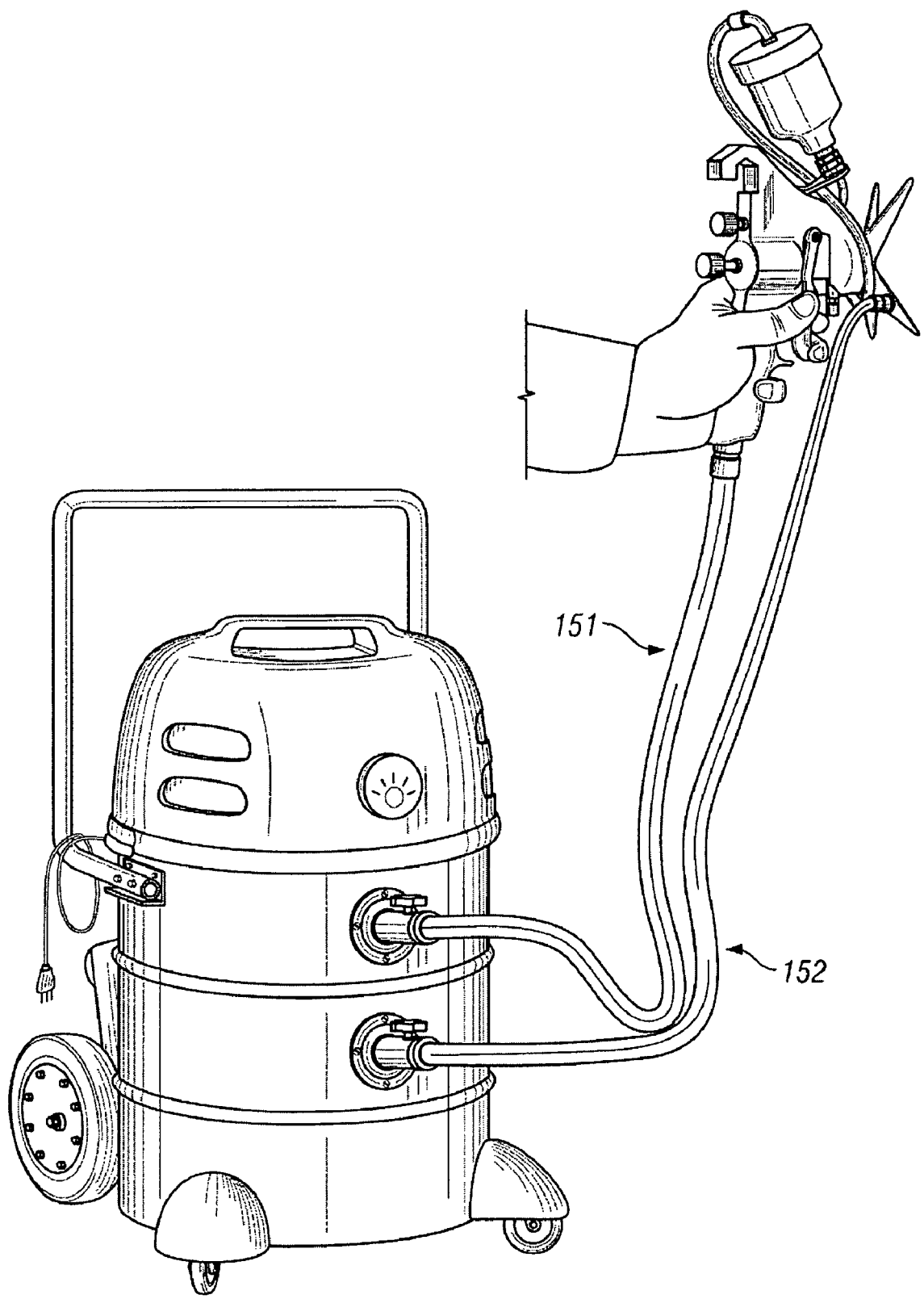
FIG. 15 is depictions of a complete system with a HVLP paint spray gun with the preferred embodiment of the overspray collection shroud and a VFAS.

FIG. 15 is a depiction of a complete system with a HVLP paint spray gun with the preferred embodiment of the overspray collection shroud and a VFAS. The vacuum hose 152 and the pressurized air supply 151 attach the shroud to the VFAS.

Figure 18:
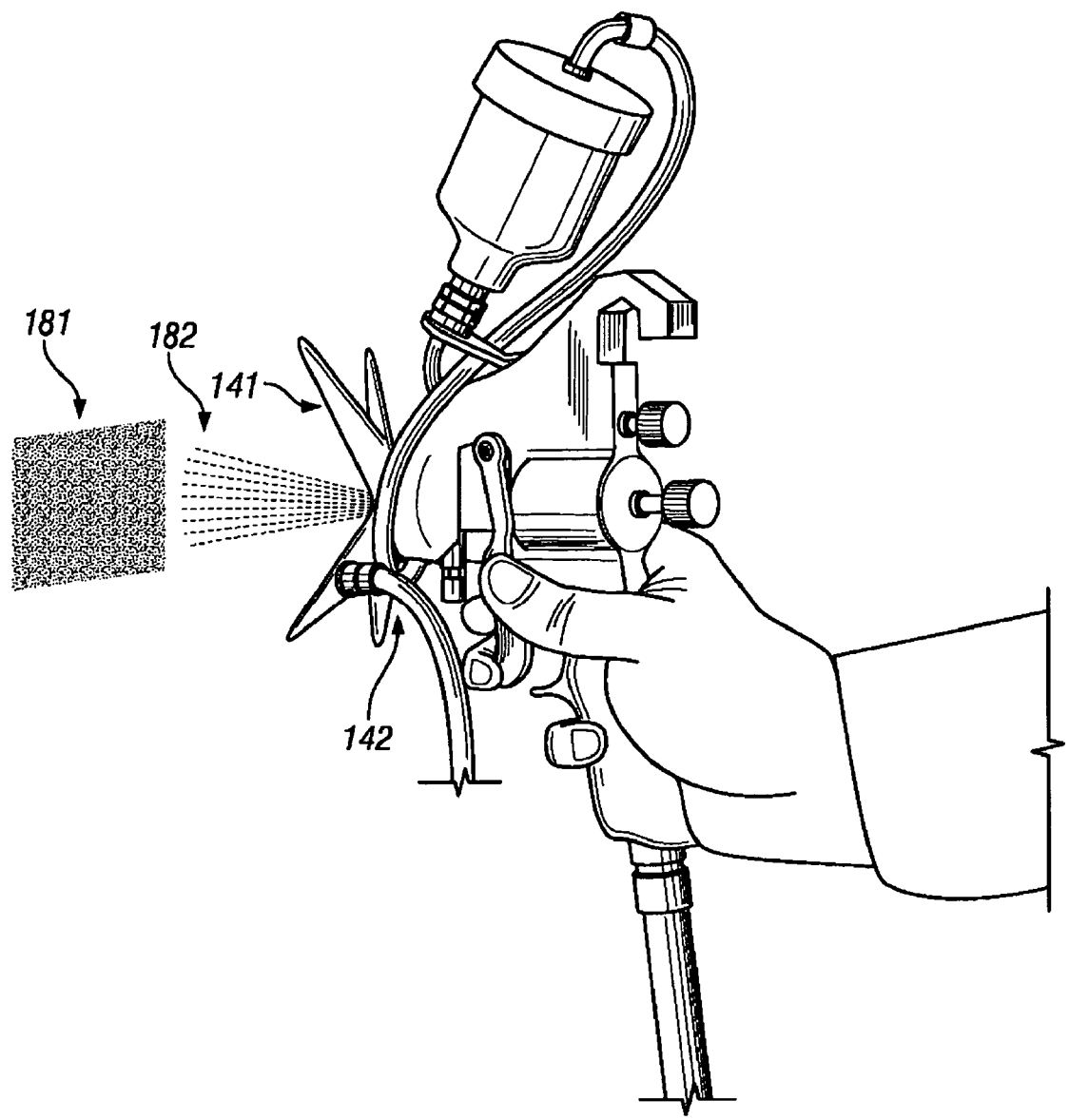
FIG. 18 is an isometric depiction of a HVLP paint spray gun with the preferred embodiment of the overspray collection shroud attached. It indicates that the user would be able to see the spray and the surface being sprayed.

FIG. 18 is an isometric depiction of a HVLP paint spray gun with the preferred embodiment of the overspray collection shroud 141 attached. A vacuum hose 142 is depicted. It can be determined from the figure that user would be able to see the spray 182 and the surface 181 that is being sprayed.

Although there are shroud embodiments of the invention disclosed here with fittings for a spray gun, there are other embodiments of the invention in which the shroud is permanently attached to a spray gun. In either case, a shroud spray centerline is taken here to be the spray centerline for the permanently attached gun or the spray centerline of a spray gun attached by way of a fitting. The shroud extent area is taken here to be the area of a circle normal to the shroud spray centerline which passes through the point on the shroud furthest from the shroud spray centerline. The shroud percent screened is a physical characteristic of a shroud taken here to be the projected area of said shroud on a plane normal to said spray centerline divided by the shroud extent area. In general terms, the higher the shroud percent screened, the more difficulty there will be seeing the area being sprayed. It is generally better, therefore, for that number to be low. A major design challenge overcome in this invention is keeping the shroud percent screened low while effectively collecting overspray. The shroud percent screened for the preferred embodiment of the invention disclosed here is approximately 40%. Embodiments with less than 80% shroud percent screened are suitable for some applications, with embodiments with less than 60% shroud percent screened being preferred and embodiments with less than 50% shroud percent screened being even more preferred.

In addition to the shrouds, the inventor claims as his invention a paint application system comprising a shroud, a paint spray gun, and at least one pump.

There are method embodiments of the invention disclosed here which involve controlling paint overspray comprising the steps of suctioning and filtering the paint overspray.

The preferred use of the equipment and methods described in this disclosure are for spray painting in portable automobile refinishing settings. However, aspects of the invention, such as the open shroud, can be used in other automobile painting settings. Furthermore, there are aspects of the invention disclosed here that would be readily applicable to painting vehicles other than automobiles. Furthermore, there are aspects of the invention disclosed here that would be readily applicable to painting things other than vehicles. It is also important to note that there are aspects of the invention disclosed here that would be readily applicable to spray applications other than painting in which capture of overspray is desired. Those non-paint applications include, but are not limited to, operations involving the spraying of hair spray, biocides, cleaners and sun-independent skin tanning agents. It will be obvious to those skilled in the art that the specific embodiments of the invention would need to be tailored to the specific needs for which the overspray capture is being applied. For example, if the invention disclosed here was to be used in spraying a fungicide, it would be important that the materials be compatible with the fungicide.

There are embodiments of the invention disclosed here which are visibility sparing spray shrouds, having a shroud spray centerline, and including a spray gun or a spray gun fitting, a vacuum fitting and a plurality of extensions each with an aperture allowing fluid communication between the interior of the shroud and the exterior of the shroud, the shroud having internal fluid passages to allow fluid communication between each of the extensions and the vacuum fitting. The fluid that travels through those internal passages could include air laden with hazardous over-spray. Among those, some have a shroud percent screened which is less than 80%. Among those, some have a shroud percent screened which is less than 60%. Among those, some have a shroud percent screened which is less than 50%.

There are embodiments of the invention disclosed here which are visibility sparing spray shrouds, having a shroud spray centerline, and including a spray gun or a spray gun fitting, a vacuum fitting and at least three extensions each with an aperture allowing fluid communication between the interior of the shroud and the exterior of the shroud, the shroud having internal fluid passages to allow fluid communication between each of the extensions and the vacuum fitting. The fluid that travels through those internal passages could include air laden with hazardous over-spray.

There are embodiments of the invention disclosed here which are visibility sparing spray shrouds, having a shroud spray centerline, and including a spray gun or a spray gun fitting, a vacuum fitting and at least four extensions each with an aperture allowing fluid communication between the interior of the shroud and the exterior of the shroud, the shroud having internal fluid passages to allow fluid communication between each of the extensions and the vacuum fitting. The fluid that travels through those internal passages could include air laden with hazardous over-spray.

There are embodiments of the invention disclosed here which are visibility sparing spray shrouds, having a shroud spray centerline, and including a spray gun or a spray gun fitting, a vacuum fitting and at less than nine extensions, each with an aperture allowing fluid communication between the interior of the shroud and the exterior of the shroud, the shroud having internal fluid passages to allow fluid communication between each of the extensions and the vacuum fitting. The fluid that travels through those internal passages could include air laden with hazardous over-spray.

There are embodiments of the invention disclosed here which are visibility sparing spray shrouds, having a shroud spray centerline, and including a spray gun or a spray gun fitting, a vacuum fitting and at less than seven extensions, each with an aperture allowing fluid communication between the interior of the shroud and the exterior of the shroud, the shroud having internal fluid passages to allow fluid communication between each of the extensions and the vacuum fitting. The fluid that travels through those internal passages could include air laden with hazardous over-spray.

There are embodiments of the invention disclosed here which are visibility sparing spray shrouds, having a shroud spray centerline, and including a spray gun or a spray gun fitting, a vacuum fitting and at less than five extensions, each with an aperture allowing fluid communication between the interior of the shroud and the exterior of the shroud, the shroud having internal fluid passages to allow fluid communication between each of the extensions and the vacuum fitting. The fluid that travels through those internal passages could include air laden with hazardous over-spray.

There are embodiments of the invention disclose here which are portable vacuum filtration and spray gun air power supply units each include an air pressurization system, a vacuum creation system, a high efficiency particulate air filter, and an organic vapor filter. Some of those units also include wheels or a differential pressure gauge. There are embodiments of the invention disclosed here which are each a portable spray and overspray capture system comprising a portable vacuum filtration and spray gun air power supply unit comprising an air pressurization system, a vacuum creation system, a high efficiency particulate air filter, and an organic vapor filter, the portable vacuum filtration and spray gun air power supply unit in pressurized air communication with, and vacuum communication with, a visibility sparing spray shroud, having a shroud spray centerline, the shroud comprising a spray gun or a spray gun fitting, a vacuum fitting and a plurality of extensions each with an aperture allowing fluid communication between the interior of the shroud and the exterior of the shroud the shroud having internal fluid passages to allow fluid communication between each of the extensions and the vacuum fitting. The fluid that travels through those internal passages could include air laden with hazardous over-spray. Some of those systems are composed of materials compatible with conventional automotive exterior paint.

From the above description and drawings, it will be understood by those of ordinary skill in the art that the particular embodiments shown and described are for purpose of illustration only, and are not intended to limit the scope of the invention. Those of ordinary skill in the art will recognize that the invention may be embodied in other specific forms without departing from its spirit or essential characteristics. References to details of particular embodiments are not intended to limit the scope of the claims.

No claim element herein is to be construed under the provisions of 35 U.S.C. §112, sixth paragraph, unless the element is expressly recited using the phrase "means for" or "step for."

The invention claimed is:

1. A visibility sparing spray shroud, having a shroud spray centerline, an exterior, an interior and a shroud percent screened, said shroud comprising: a central region including a spray gun or a spray gun fitting, a vacuum fitting and a plurality of elongated extensions radiating from said central region, situated in pattern with significant visual gaps between said elongated extensions each extension with an aperture allowing fluid communication between said interior of said shroud and said exterior of said shroud having internal fluid passages to allow fluid communication between each of said extensions and said vacuum fitting and said interior also housing a vapor particulate pre-filter.

2. A visibility sparing spray shroud as in claim 1 in which said shroud percent screened is less than 80%.

3. A visibility sparing spray shroud as in claim 2 in which said shroud percent screened is less than 60%.

4. A visibility sparing spray shroud as in claim 3 in which the shroud percent screened is less than 50%.

5. A visibility sparing spray shroud as in claim 2 with not less than three extensions.

6. A visibility sparing spray shroud as in claim 5 with not less than four extensions.

7. A visibility sparing spray shroud a in claim 1 in which said apertures are elongated slits.

8. A visibility sparing spray shroud as in claim 1 comprising a fitting for attachment to a separate spray gun.

9. A visibility sparing spray shroud as in claim 1 comprising a hand grip.

10. A visibility sparing spray shroud as in claim 9 in which the shroud is handheld.

11. A visibility sparing spray shroud as in claim 10 in which the shroud can operate under the direct manual control of a user.

12. A visibility sparing spray shroud as in claim 1 further comprising a hand grip.

13. A visibility sparing spray shroud as in claim 1 comprising a first shell component and second shell component which can be reversibly fitted together to secure said pre-filter and can be reversibly separated to allow removal of the pre-filter.

14. A portable spray and overspray capture system comprising a portable vacuum filtration and spray gun air power supply unit comprising an air pressurization system, a vacuum creation system, a high efficiency particulate air filter, and an organic vapor filter, said portable vacuum filtration and spray gun air power supply unit in pressurized air communication with, and vacuum communication with, a visibility sparing spray shroud, having a shroud spray centerline, an exterior, and an interior, said shroud comprising a spray gun or a spray gun fitting, a vacuum fitting and a plurality of elongated extensions radiating from said central region, situated in pattern with significant visual gaps between said elongated extensions, each extension with an aperture allowing fluid communication between said interior of said shroud and said exterior of said shroud having internal fluid passages to allow fluid communication between each of said extensions and said vacuum fitting and said interior also housing a vapor particulate pre-filter.

15. A portable spray and overspray capture system as in claim 14 in which said system is composed of materials which are compatible with conventional automotive exterior paint.

* * * * *